(12) United States Patent
Nam et al.

(10) Patent No.: US 9,934,753 B2
(45) Date of Patent: Apr. 3, 2018

(54) DISPLAY DEVICE INCLUDING VOLTAGE LIMITER AND DRIVING METHOD THEREOF

(71) Applicant: SAMSUNG DISPLAY CO., LTD., Yongin, Gyeonggi-do (KR)

(72) Inventors: Yang Uk Nam, Yongin-si (KR); Jong Jae Lee, Yongin-si (KR); Su Jin Kim, Yongin-si (KR); Dae Sik Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/132,519

(22) Filed: Apr. 19, 2016

(65) Prior Publication Data

US 2017/0098424 A1    Apr. 6, 2017

(30) Foreign Application Priority Data

Oct. 1, 2015   (KR) ........................ 10-2015-0138670

(51) Int. Cl.
| G09G 5/00 | (2006.01) |
| G09G 3/36 | (2006.01) |
| G01K 1/20 | (2006.01) |
| G01K 7/22 | (2006.01) |
| G01K 13/00 | (2006.01) |
| G06F 1/26 | (2006.01) |
| G06F 1/32 | (2006.01) |

(52) U.S. Cl.
CPC ............. *G09G 3/3696* (2013.01); *G01K 1/20* (2013.01); *G01K 7/22* (2013.01); *G01K 13/00* (2013.01); *G06F 1/263* (2013.01); *G06F 1/3206* (2013.01); *G09G 3/3677* (2013.01); *G09G 2310/0289* (2013.01); *G09G 2310/0291* (2013.01); *G09G 2310/08* (2013.01); *G09G 2320/041* (2013.01); *G09G 2330/021* (2013.01); *G09G 2330/045* (2013.01)

(58) Field of Classification Search
CPC .. G09G 3/3674; G09G 3/3696; G09G 3/3677; G01K 1/20; G01K 7/22; G01K 13/00; G06F 1/236; G06F 1/3206
USPC ........................................................ 345/211
See application file for complete search history.

(56) References Cited

U.S. PATENT DOCUMENTS

| 8,461,812 B2 | 6/2013 | Kim et al. | |
| 2007/0216671 A1* | 9/2007 | Oku | ........................ G09G 3/367 |
| | | | 345/211 |
| 2008/0054987 A1* | 3/2008 | Choi | .................... G09G 3/3696 |
| | | | 327/512 |

(Continued)

FOREIGN PATENT DOCUMENTS

| KR | 1013061380000 B1 | 9/2013 |
| KR | 101369154 B1 | 2/2014 |

*Primary Examiner* — Adam J Snyder
(74) *Attorney, Agent, or Firm* — Cantor Colburn LLP

(57) ABSTRACT

A display device includes a scan driver which supplies a gate-on voltage or a gate-off voltage to scan lines, and a power supply unit which supplies the gate-off voltage to the scan driver, and includes a temperature sensor which generates a sensing voltage of which voltage value is changed corresponding to a temperature of a panel or an ambient temperature, a first voltage limiter which limits a minimum voltage value of the sensing voltage, and a second voltage limiter which limits a maximum voltage value of the sensing voltage.

16 Claims, 11 Drawing Sheets

(56) References Cited

U.S. PATENT DOCUMENTS

| | | | |
|---|---|---|---|
| 2008/0122829 A1* | 5/2008 | Park | G09G 3/3677 345/213 |
| 2009/0102779 A1* | 4/2009 | Jo | G09G 3/3696 345/101 |
| 2010/0039364 A1* | 2/2010 | Lee | G09G 3/3696 345/100 |
| 2010/0053054 A1* | 3/2010 | Jeong | G09G 3/3674 345/92 |
| 2011/0205212 A1* | 8/2011 | Matsumoto | G09G 3/3677 345/211 |
| 2011/0273416 A1* | 11/2011 | Bae | G09G 3/3648 345/211 |
| 2011/0298780 A1* | 12/2011 | Murakami | G05F 3/20 345/212 |
| 2012/0169744 A1* | 7/2012 | Seo | G09G 3/3696 345/519 |
| 2013/0169614 A1* | 7/2013 | Huang | G09G 3/3677 345/212 |
| 2014/0168041 A1* | 6/2014 | Chen | G09G 3/3696 345/87 |
| 2016/0149574 A1* | 5/2016 | Cui | G09G 3/3696 327/513 |

* cited by examiner

Gain 16

Gain 1.18

DISPLAY DEVICE INCLUDING VOLTAGE LIMITER AND DRIVING METHOD THEREOF

This application claims priority to Korean Patent Application No. 10-2015-0138670, filed on Oct. 1, 2015, and all the benefits accruing therefrom under 35 U.S.C. § 119, the content of which in its entirety is herein incorporated by reference.

BACKGROUND

1. Field

Exemplary embodiments of the invention relate to a display device and a driving method thereof, and more particularly, to a display device and a driving method thereof, which can improve display quality.

2. Description of the Related Art

With a development of information technologies, an importance of a display device which is a connection medium between a user and information increases. Accordingly, display devices such as a liquid crystal display device and an organic light emitting display device are increasingly used.

In general, a display device includes a data driver for supplying data signals to data lines, a scan driver for supplying scan signals to scan lines, and a pixel unit including pixels arranged in areas defined by the scan lines and the data lines.

Pixels included in the pixel unit are selected when a scan signal is supplied to a scan line, and thereby receive a data signal supplied from a data line. The pixels supplied with the data signal, supply light of a luminance corresponding to the data signal to an outside. To this end, each of the pixels includes a switching transistor turned on when a scan signal is supplied to receive a voltage of a data signal.

SUMMARY

Characteristics of the switching transistor change with a change of a temperature, particularly, a high temperature of 40 degrees Celsius (° C.) or more. When the characteristics of the switching transistor are changed, a voltage margin becomes insufficient, and accordingly, a decoloration phenomenon occurs in a panel.

Embodiments provide a display device and a driving method thereof, which can improve display quality.

According to an exemplary embodiment of the invention, there is provided a display device including a scan driver which supplies a gate-on voltage or a gate-off voltage to scan lines, and a power supply unit which supplies the gate-off voltage to the scan driver, wherein the power supply unit includes: a temperature sensor which generates a sensing voltage of which voltage value is changed corresponding to a temperature of a panel or an ambient temperature, a first voltage limiter which limits a minimum voltage value of the sensing voltage, and a second voltage limiter which limits a maximum voltage value of the sensing voltage.

In an exemplary embodiment, the display device may further include a first storage unit which stores a first control value corresponding to the minimum voltage value, and a second storage unit which stores a second control value corresponding to the maximum voltage value.

In an exemplary embodiment, the first control value may be set corresponding to a first temperature, and the second control value may be set corresponding to a second temperature lower than the first temperature.

In an exemplary embodiment, the first voltage limiter may output the first control value when the sensing voltage is set to be less than the first control value, and otherwise, output the sensing voltage.

In an exemplary embodiment, the second voltage limiter may output the second control value when the sensing voltage exceeds the second control value, and otherwise, output the sensing voltage.

In an exemplary embodiment, the display device may further include a timing controller which controls the scan driver. The first control value and the second control value may be changeable by the timing controller.

In an exemplary embodiment, the temperature sensor may include a first resistor and a second resistor coupled in series between a first driving power source and a second driving power source different from the first driving power source, and a thermistor coupled in parallel to the first resistor between the first driving power source and a first node that is a common node of the first resistor and the second resistor. The voltage of the first node may be the sensing voltage.

In an exemplary embodiment, the thermistor may be a negative temperature coefficient ("TC") thermistor.

In an exemplary embodiment, the display device may further include a voltage converter which changes a voltage value of the sensing voltage and supply the changed voltage value to the first voltage limiter.

In an exemplary embodiment, the display device may further include a gain controller which generates the gate-off voltage by changing a voltage value of a voltage output from the second voltage limiter, corresponding to a gain.

In an exemplary embodiment, the gain controller may include an operational amplifier ("OP-AMP") including a first input terminal as a non-inverting input terminal, a second input terminal as an inverting input terminal, and an output terminal, and a third resistor and a fourth resistor, coupled in series between the output terminal and a third driving power source, wherein the first input terminal is coupled to the second voltage limiter, and the second input terminal is coupled to a second node as a common node of the third resistor and the fourth resistor.

In an exemplary embodiment, the first voltage limiter may include a first resistor and a second resistor, coupled in series between a first driving power source and a second driving power source having a higher voltage value than that of the first driving power source, a first capacitor coupled between the second driving power source and a first node as a common node between the first resistor and the second resistor, an OP-AMP including a first input terminal, as a non-inverting input terminal, coupled to the first node and a second input terminal, as an inverting input terminal, supplied with the sensing voltage, a third resistor coupled to an output terminal of the OP-AMP, and a first transistor including a base terminal coupled to the third resistor, a collector terminal coupled to the second driving power source, and an emitter terminal supplied with the sensing voltage.

In an exemplary embodiment, the OP-AMP may supply a voltage of the second driving power source to the third resistor when the voltage of the second input terminal is lower than the voltage of the first input terminal, and supply the voltage of the first driving power source to the third resistor when the voltage of the second input terminal is higher than the voltage of the first input terminal.

In an exemplary embodiment, the first transistor may be turned on when the voltage of the second driving power source is supplied, and turned off when the voltage of the first driving power source is supplied.

In an exemplary embodiment, the second voltage limiter may include a first resistor and a second resistor, coupled in series between a first driving power source and a second driving power source having a higher voltage value than that of the first driving power source, a first capacitor coupled between the second driving power source and a first node as a common node between the first resistor and the second resistor, an OP-AMP including a first input terminal, as a non-inverting input terminal, coupled to the first node and a second input terminal, as an inverting input terminal, supplied with the sensing voltage, a third resistor coupled to an output terminal of the OP-AMP, and a first transistor including a base terminal coupled to the third resistor, a collector terminal coupled to the first driving power source, and an emitter terminal supplied with the sensing voltage.

In an exemplary embodiment, the OP-AMP may supply the voltage of the first driving power source to the third resistor when the voltage of the second input terminal is higher than the voltage of the first input terminal, and supply the voltage of the second driving power source to the third resistor when the voltage of the second input terminal is lower than the voltage of the first input terminal.

In an exemplary embodiment, the first transistor may be turned on when the voltage of the first driving power source is supplied, and turned off when the voltage of the second driving power source is supplied.

According to an exemplary embodiment of the invention, there is provided a method of driving a display device including a scan driver for supplying a gate-on voltage or a gate-off voltage to scan lines, the method including: maintaining the gate-off voltage as a first voltage, corresponding to a first control value, when a temperature of a panel or an ambient temperature is higher than a first temperature, maintaining the gate-off voltage as a second voltage higher than the first voltage, corresponding to a second control value, when the temperature of the panel or the ambient temperature is lower than a second temperature, and increasing the gate-off voltage from the first voltage to the second voltage, when the temperature of the panel or the ambient temperature is lowered from the first temperature to the second temperature.

In an exemplary embodiment, the first voltage and the second voltage may be negative voltages.

In an exemplary embodiment, the first control value and the second control value may be changeable by a timing controller for controlling the scan driver.

In the display device and the driving method thereof according to the invention, a gate-off voltage supplied to a gate electrode of a switching transistor is changed corresponding to the temperature. In other words, in the exemplary embodiment of the invention, as the temperature increases, the voltage value of the gate-off voltage is decreased. Accordingly, a voltage margin required in the driving is secured, thereby improving display quality. Also, in the exemplary embodiment of the invention, the minimum voltage value and maximum voltage value of the gate-off voltage are limited, thereby ensure the reliability of operation.

BRIEF DESCRIPTION OF THE DRAWINGS

Example embodiments will now be described more fully hereinafter with reference to the accompanying drawings, in which.

DETAILED DESCRIPTION

Figure 1:
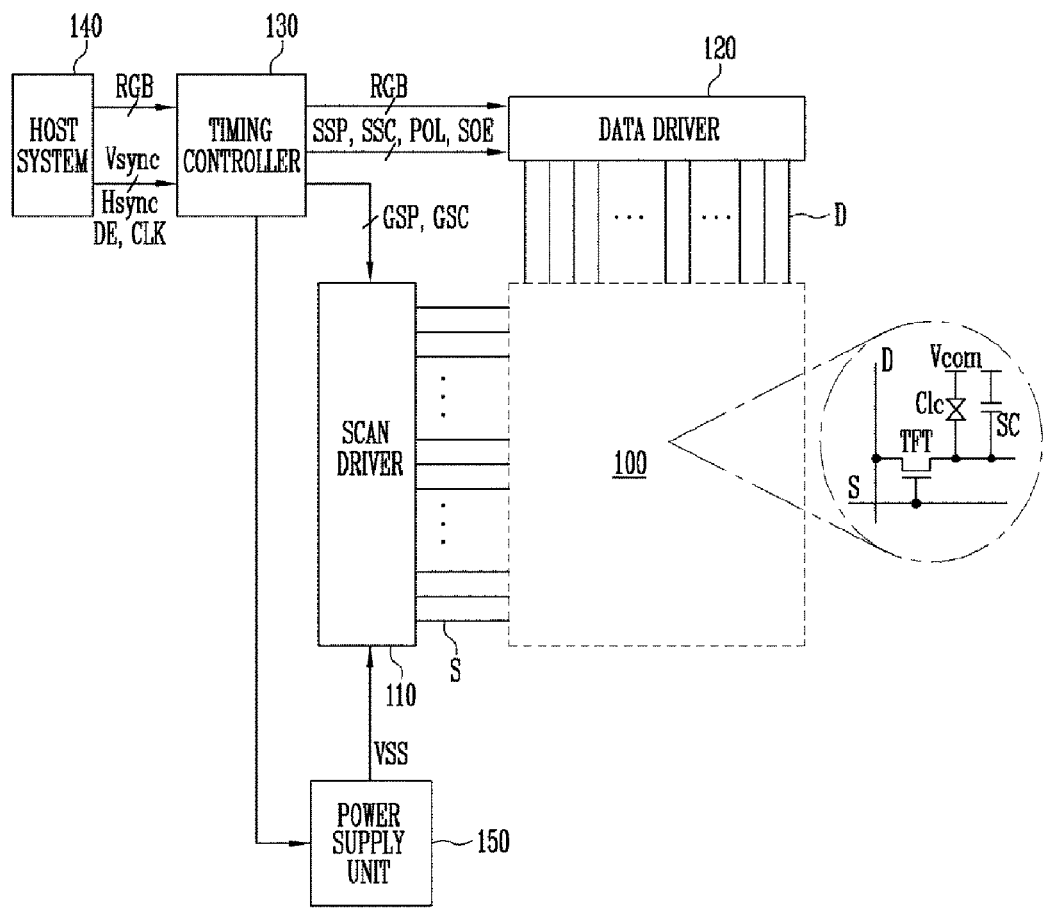
FIG. 1 is a diagram schematically illustrating a display device according to an exemplary embodiment of the invention.

In the following detailed description, only certain exemplary embodiments of the invention have been shown and described, simply by way of illustration. As those skilled in the art would realize, the described embodiments may be modified in various different ways, all without departing from the spirit or scope of the invention. Accordingly, the drawings and description are to be regarded as illustrative in nature and not restrictive.

In the entire specification, when an element is referred to as being "connected" or "coupled" to another element, it can be directly connected or coupled to the another element or be indirectly connected or coupled to the another element with one or more intervening elements interposed therebetween. Further, some of the elements that are not essential to the complete understanding of the invention are omitted for clarity. Also, like reference numerals refer to like elements throughout.

In the drawing figures, dimensions may be exaggerated for clarity of illustration. It will be understood that when an element is referred to as being "between" two elements, it can be the only element between the two elements, or one or more intervening elements may also be present.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a diagram schematically illustrating a display device according to an exemplary embodiment of the invention. In FIG. 1, for convenience of illustration, it is assumed that the display device is a liquid crystal display device, but the invention is not limited thereto.

Referring to FIG. 1, the display device according to the exemplary embodiment of the invention includes a pixel unit 100, a scan driver 110, a data driver 120, a timing controller 130, a host system 140, and a power supply unit 150.

The pixel unit 100 may be an effective display unit of a liquid crystal panel. The liquid crystal panel includes a thin film transistor ("TFT") substrate and a color filter substrate. A liquid crystal layer is disposed between the TFT substrate and the color filter substrate. Data lines D and scan lines S are disposed on the TFT substrate, and a plurality of pixels is arranged in areas defined by the scan lines S and the data lines D.

A TFT (i.e., a switching transistor) included in each pixel transmits, to a liquid crystal capacitor Clc, the voltage of a data signal supplied via a data line D in response to a scan signal from a scan line S. To this end, a gate electrode of the TFT is coupled to the scan line S, and a first electrode of the TFT is coupled to the data line D. Also, a second electrode of the TFT is coupled to the liquid crystal capacitor Clc and a storage capacitor SC.

Here, the first electrode may be any one of source and drain electrodes of the TFT, and the second electrode may be the other electrode different from the first electrode. In an exemplary embodiment, when the first electrode is set as the drain electrode, the second electrode is set as the source electrode. The liquid crystal capacitor Clc equivalently represents liquid crystals between a pixel electrode (not shown) and a common electrode, which are disposed on the TFT substrate. The storage capacitor SC maintains the voltage of a data signal transmitted to the pixel electrode for a predetermined time until a next data signal is supplied.

Black matrices, color filters, and the like are disposed on the color filter substrate.

In an exemplary embodiment, the common electrode is disposed on the color filter substrate in a vertical electric field driving manner such as a twisted nematic ("TN") mode and a vertical alignment ("VA") mode, for example. In an exemplary embodiment, the common electrode is provided together with the pixel electrode on the TFT substrate in a horizontal electric field driving manner such as an in-plane switching ("IPS") mode and a fringe field switching ("FFS") mode, for example. A common voltage Vcom is supplied to the common electrode. The liquid crystal mode of the liquid crystal panel may be implemented in any liquid crystal mode as well as the TN, VA, IPS, and FFS modes.

The data driver 120 converts image data RGB input from the timing controller 130 into a positive/negative gamma compensation voltage to generate a positive/negative analog data voltage. The positive/negative analog data voltage generated by the data driver 120 is supplied as a data signal to the data lines D.

Figure 2:
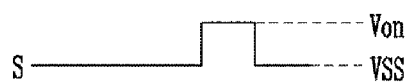
FIG. 2 is a diagram illustrating a scan signal generated by a scan driver shown in FIG. 1.

The scan driver 110 supplies a scan signal to the scan lines S. In an exemplary embodiment, the scan driver 110 may sequentially supply the scan signal to the scan lines S. According to an embodiment, as shown in FIG. 2, the scan driver 110 may supply a gate-on voltage Von to the scan lines S during a period in which the scan signal is supplied. In addition, the scan driver 110 may supply a gate-off voltage VSS to the scan lines S during a period in which the scan signal is not supplied. Here, the gate-on voltage Von may be a voltage at which the TFT is turned on, and the gate-off voltage VSS may be a voltage at which the TFT is turned off. The gate-off voltage VSS may be set as a negative voltage such that a margin of a driving voltage is secured at the same time when the TFT is completely turned off.

When the scan signal is sequentially supplied to the scan lines S, pixels are selected in units of horizontal lines, and the pixels selected by the scan signal are supplied with a data signal. In an exemplary embodiment, the scan driver 110 may be mounted in an amorphous silicon gate driver ("ASG") on the liquid crystal panel, for example. That is, the scan driver 110 may be mounted on the TFT substrate through a thin film process. Also, the scan driver 110 may be mounted at both sides of the liquid crystal panel with the pixel unit 100 interposed therebetween.

The timing controller 130 supplies a gate control signal to the scan driver 110 and supplies a data control signal to the data driver 120, based on timing signals such as image data RGB, a vertical synchronization signal Vsnyn, a horizontal synchronization signal Hsync, a data enable signal DE, and a clock signal CLK, which are output from the host system 140.

The gate control signal includes a gate start pulse GSP, one or more gate shift clocks GSC, and the like. The gate start pulse GSP controls timing of a first scan signal. The gate shift clock GSC may be one or more clock signals for shifting the gate start pulse GSP.

The data control signal includes a source start pulse SSP, a source sampling clock SSC, a source output enable signal SOE, a polarity control signal POL, and the like. The source start pulse SSP controls a data sampling start time of the data driver 120. The source sampling clock SSC controls a sampling operation of the data driver 120, based on a rising or falling edge. The source output enable signal SOE controls output timing of the data driver 120. The polarity control signal POL inverts the polarity of a data signal output from the data driver 120.

In an exemplary embodiment, the host system 140 supplies image data RGB to the timing controller 130 through an interface such as a low voltage differential signaling ("LVDS") interface or a transition minimized differential signaling ("TMDS") interface. Also, the host system 140 supplies timing signals Vsync, Hsync, DE, and CLK to the timing controller 130.

The power supply unit 150 generates a gate-off voltage VSS under control of the timing controller 130, and supplies the generated gate-off voltage VSS to the scan driver 110. Here, the power supply unit 150 controls a voltage value of the gate-off voltage VSS, corresponding to an ambient temperature or a temperature of the liquid crystal panel. In an exemplary embodiment, the power supply unit 150 may lower the voltage value of the gate-off voltage VSS such that the TFT stably maintains a turn-off state at a high temperature of about 40 degrees Celsius (° C.) or higher, regardless of a characteristic change of the TFT, for example.

The power supply unit 150 may be located on the liquid crystal panel or an external PCB (not shown). When the power supply unit 150 is located on the liquid crystal panel, the gate-off voltage may be controlled corresponding to the temperature of the liquid crystal panel. When the power supply unit 150 is located on the PCB, the gate-off voltage VSS may be controlled corresponding to the ambient temperature.

In FIG. 1, it is illustrated that only the gate-off voltage VSS is generated by the power supply unit 150 so as to emphasize features of the invention, but the invention is not limited thereto. In an exemplary embodiment, the power supply unit 150 may additionally generate various voltages used in the liquid crystal panel, including the gate-on voltage Von.

Figure 3:
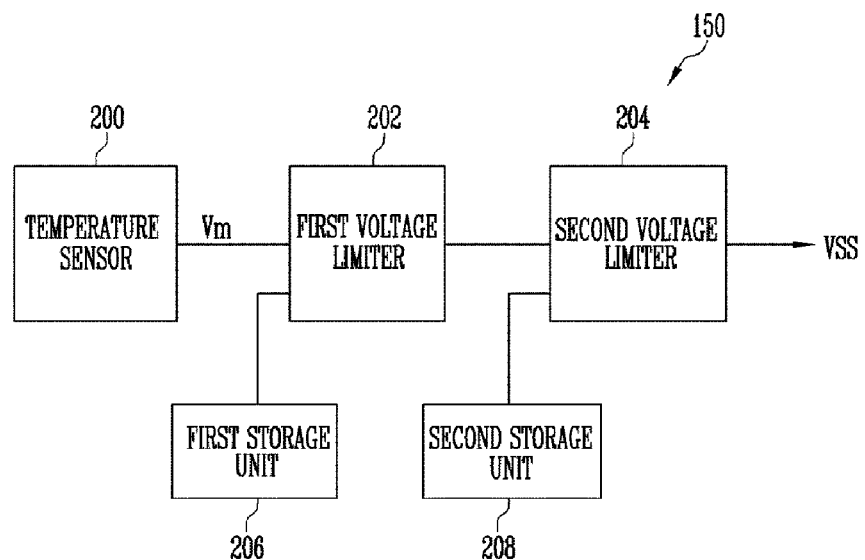
FIG. 3 is a diagram illustrating a power supply unit according to an exemplary embodiment of the invention.

FIG. 3 is a diagram illustrating a power supply unit according to an exemplary embodiment of the invention.

Referring to FIG. 3, the power supply unit 150 according to an exemplary embodiment of the invention includes a temperature sensor 200, a first voltage limiter 202, a second voltage limiter 204, a first storage unit 206, and a second storage unit 208.

The temperature sensor 200 generates a sensing voltage Vm, corresponding to a temperature of the liquid crystal panel or an ambient temperature. Hereinafter, for convenience of illustration, it is assumed that the temperature sensor 200 senses the temperature of the liquid crystal panel. The temperature sensor 200 generates the sensing voltage Vm to be in proportion to or in inverse proportion to the temperature. That is, the temperature sensor 200 generates the sensing voltage Vm changed corresponding to the temperature, and may be variously configured.

Figure 5:
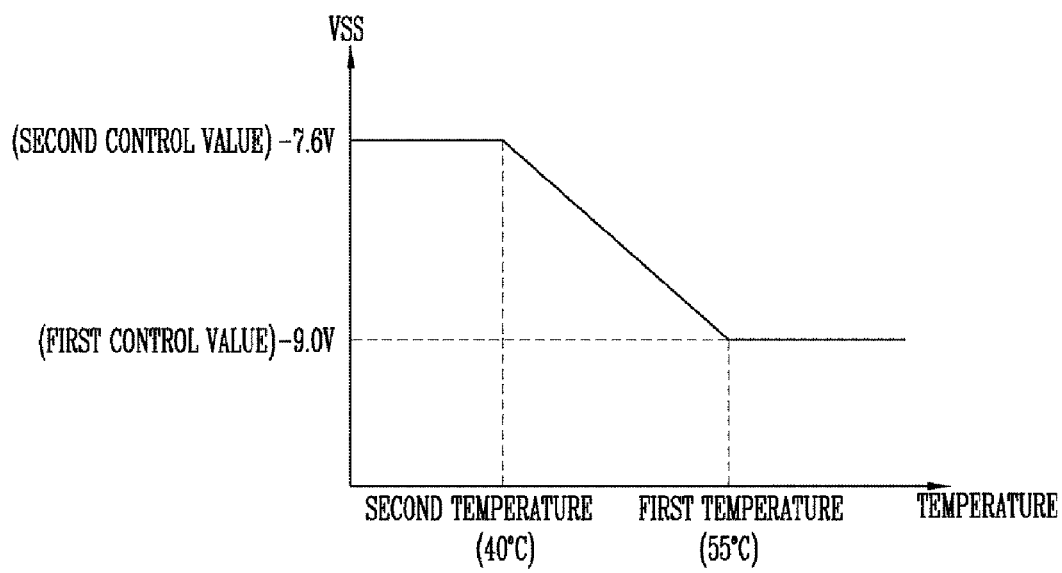
FIG. 5 is a diagram illustrating an exemplary embodiment of a gate-off voltage generated by the power supplies of FIGS. 3 and 4.

The first storage unit 206 stores a first control value. Here, the first control value is set corresponding to the minimum voltage value of the gate-off voltage VSS. More specifically, when the temperature of the liquid crystal panel is increased to a high temperature as shown in FIG. 5, the gate-off voltage VSS is decreased so as to secure a voltage margin. In this state, when the gate-off voltage VSS is set to the minimum voltage value, e.g., −9.0 volts (V), a sufficient voltage margin for driving the TFT can be secured regardless of the temperature.

The second storage unit 208 stores a second control value. Here, the second control value is set corresponding to the maximum voltage value of the gate-off voltage VSS. More specifically, when the temperature of the liquid crystal panel is decreased to a low temperature as shown in FIG. 5, the gate-off voltage VSS is increased. In this state, when the gate-off voltage VSS is increased to the maximum voltage value, e.g., −7.6 V or more, the sufficient voltage margin for driving the TFT is not secured.

The first control value may be set corresponding to a first temperature, e.g., 55 degrees Celsius (° C.), and the second control value may be set corresponding to a second temperature, e.g., 40° C. Then, the gate-off voltage VSS maintains the maximum voltage value when the temperature of the liquid crystal panel is set to be less than the second temperature, and maintains the minimum voltage value when the temperature of the liquid crystal panel exceeds the first temperature. When the temperature of the liquid crystal panel is a specific temperature between the first temperature and the second temperature, the gate-off voltage VSS is set corresponding to the specific temperature.

Additionally, the first control value and the second control value, respectively stored in the first storage unit 206 and the second storage unit 208, may be changed by the timing controller 130. In an exemplary embodiment, the timing controller 130 may change the first control value and the second control value using inter-integrated circuit ("I2C") BUS interface ("I/F"), for example. In this case, the voltage value of the gate-off voltage VSS may be controlled corresponding to a driving environment of the liquid crystal panel.

The first voltage limiter 202 is supplied with a sensing voltage Vm and a first control value. The first voltage limiter 202 outputs the first control value when the sensing voltage Vm is set to be less than the first control value, and otherwise, outputs the sensing voltage Vm. In an exemplary embodiment, when the sensing voltage Vm is set to −9.1 V (or voltage corresponding thereto) and the first control value is set to −9.0 V (or voltage corresponding thereto), the first voltage limiter 202 outputs the first control value, for example. When the sensing voltage Vm is set to −8.1 V (or voltage corresponding thereto) and the first control value is set to −9.0 V (or voltage corresponding thereto), the first voltage limiter 202 outputs the sensing voltage Vm, for example. In an exemplary embodiment, the first voltage limiter 202 may include a comparator or the like, for example.

The second voltage limiter 204 is supplied with a sensing voltage Vm (or first control value) and a second control value. The second voltage limiter 204 supplied with the sensing voltage Vm (or first control value) and the second control value outputs the second control value when the sensing voltage Vm (or first control value) exceeds the second control value, and otherwise, outputs the sensing voltage Vm (or first control value). In an exemplary embodiment, when the sensing voltage Vm is set to −8 V (or voltage corresponding thereto) and the second control value is set to −7.6 V (or voltage corresponding thereto), the second voltage limiter 204 outputs the sensing voltage Vm, for example. When the sensing voltage Vm is set to −6 V (or voltage corresponding thereto) and the second control value is set to −7.6 V (or voltage corresponding thereto), the second voltage limiter 204 outputs the second control value, for example. In an exemplary embodiment, the second voltage limiter 204 may include a comparator or the like, for example.

The sensing voltage Vm, the first control value, or the second control value output from the second voltage limiter 204 is supplied as a gate-off voltage VSS to the scan driver 110. Then, the gate-off voltage VSS is changed corresponding to the temperature, and accordingly, a voltage margin of the TFT is secured, thereby improving display quality.

Figure 4:
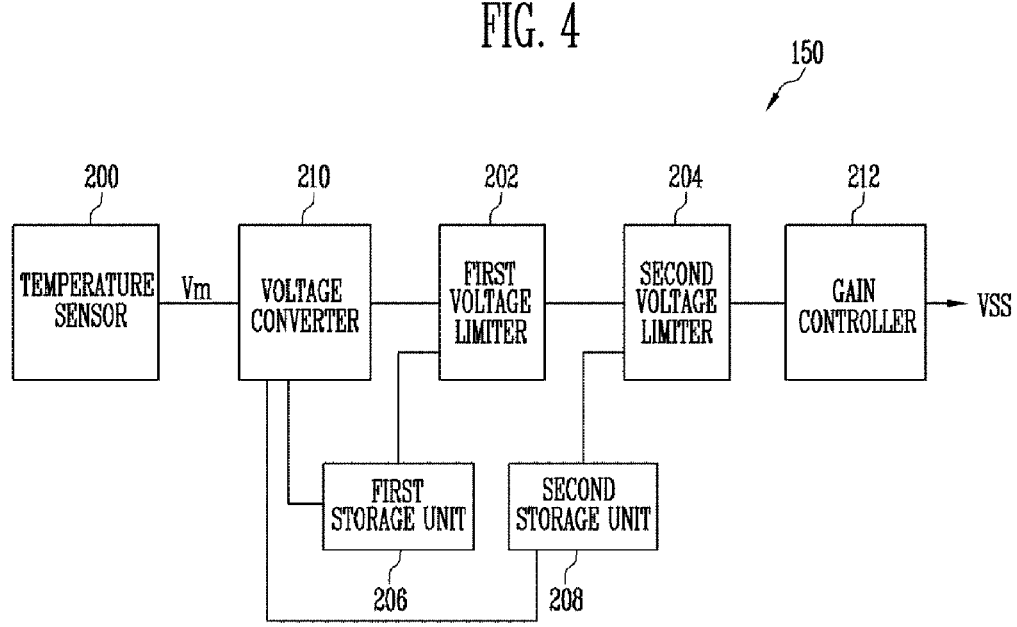
FIG. 4 is a diagram illustrating a power supply unit according to another exemplary embodiment of the invention.

FIG. 4 is a diagram illustrating a power supply unit according to another exemplary embodiment of the invention. In FIG. 4, components identical to those of FIG. 3 are designated by like reference numerals, and their detailed descriptions will be omitted.

Referring to FIG. 4, the power supply unit 150 according to the exemplary embodiment of the invention includes a temperature sensor 200, a voltage converter 210, a first voltage limiter 202, a second voltage limiter 204, a first storage unit 206, a second storage unit 208, and a gain controller 212.

The voltage converter 210 is supplied with a sensing voltage Vm from the temperature sensor 200. The voltage converter 210 supplied with the sensing voltage Vm changes a voltage value of the sensing voltage Vm and supplies the changed voltage value to the first voltage limiter 202. The voltage converter 210 may change the voltage value of the sensing voltage Vm corresponding to a first control value and a second control value.

More specifically, the sensing voltage Vm is generated corresponding to the temperature, and it is difficult to accurately control the voltage value of the sensing voltage Vm. Therefore, the voltage converter 210 may be installed between the temperature sensor 200 and the first voltage limiter 202, and the voltage value of the sensing voltage Vm may be changed to correspond to the first control value and the second control value using the voltage converter 210. In an exemplary embodiment, when the first control value is set to −9.0 V and the second control value is set to −7.6 V, the voltage converter 210 may control the sensing voltage Vm to be set to −9.0 V to −7.6 V between a first temperature and a second temperature. When the first control value is set to −3V and the second control value is set to −1 V, the voltage converter 210 may control the sensing voltage Vm to be set to −3 V to −1 V between the first temperature and the second temperature, for example.

The gain controller 212 changes the voltage value of a voltage output from the second voltage limiter 204. In an exemplary embodiment, the gain controller 212 may change the voltage output from the second voltage limiter 204 by adjusting a gain of an operational amplifier ("OP-AMP"). That is, the gain controller 212 may control the voltage output from the second voltage limiter 204 to be set to −7.6 V to −9.0 V, for example. This will be described in detail later.

Figure 6:
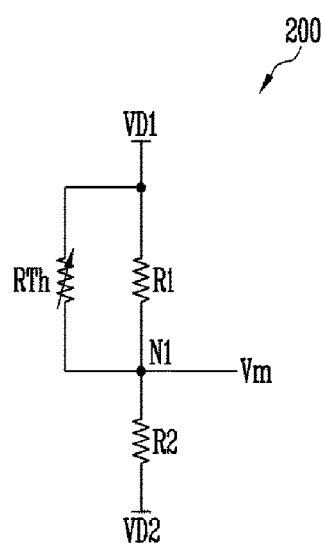
FIG. 6 is a diagram illustrating an exemplary embodiment of a temperature sensor shown in FIG. 3.

FIG. 6 is a diagram illustrating an exemplary embodiment of the temperature sensor shown in FIG. 3.

Referring to FIG. 6, the temperature sensor 200 according to the invention includes a first resistor R1, a second resistor R2, and a thermistor RTh.

The first resistor R1 and the second resistor R2 are coupled in series between a first driving power source VD1 and a second driving power source VD2. Here, the first driving power source VD1 and the second driving power source VD2 are set to different voltages from each other.

The thermistor RTh is coupled between the first driving power source VD1 and a first node N1 that is a common node of the first resistor R1 and the second resistor R2. That is, the thermistor RTh is coupled in parallel to the first resistor R1, and the resistance of the thermistor RTh is changed corresponding to temperature.

In an exemplary embodiment, when the thermistor RTh is a negative temperature coefficient ("NTC") thermistor, the resistance of the thermistor RTh is decreased corresponding to an increase in temperature. When the thermistor RTh is a positive temperature coefficient ("PTC") thermistor, the resistance of the thermistor RTh is increased corresponding to an increase in temperature. Hereinafter, for convenience of illustration, it is assumed that the thermistor RTh is the NTC thermistor.

Figure 7:
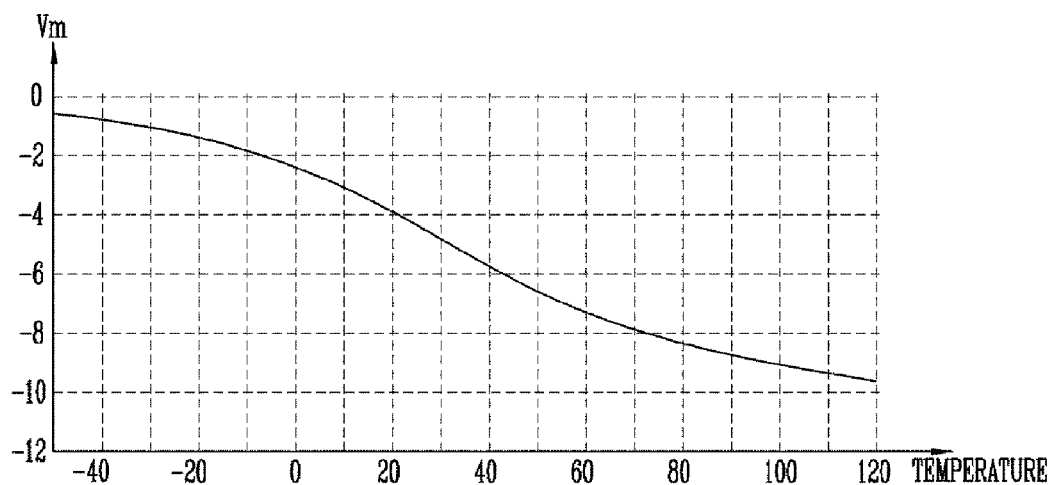
FIG. 7 is a diagram illustrating an exemplary embodiment of an operating process of the temperature sensor shown in FIG. 6.

When the resistance of the thermistor RTh is decreased corresponding to an increase in temperature, the parallel resistance provided by the first resistor R1 and the thermistor RTh is decreased. In this case, a voltage of the first node N1, i.e., a sensing voltage Vm is changed. In an exemplary embodiment, when the voltage of the first driving power source VD1 is set to −10.6 V and the voltage of the second driving power source VD2 is set to a ground voltage, the sensing voltage Vm is changed corresponding to temperature as shown in FIG. 7, for example. That is, the sensing voltage Vm may be set to about −5.51 V at 40° C., and set to about −6.78 V at 55° C. Additionally, the characteristic curve of the sensing voltage Vm of FIG. 7 may be changed corresponding to resistance values of the first resistor R1 and the second resistor R2 and characteristics of the thermistor RTh.

In the exemplary embodiment of the invention, the first driving power source VD1 may be set to a positive voltage and the second driving power source VD2 may be set to a negative voltage, for example. In this case, the voltage of the first node N1, i.e., the sensing voltage Vm is increased corresponding to the temperature. In this case, the voltage converter 210 may control the voltage value of the sensing voltage Vm by subtracting the sensing voltage Vm from a specific voltage. In an exemplary embodiment, the voltage converter 210 may include an operation unit or the like, for example.

Figure 8:
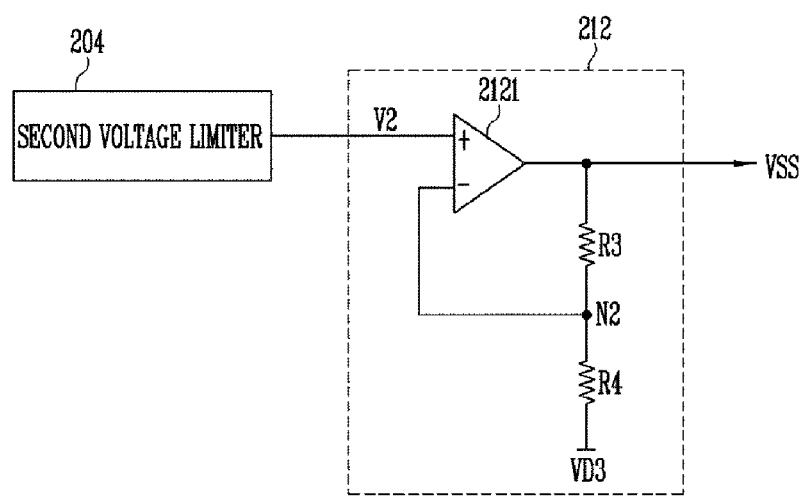
FIG. 8 is a diagram illustrating an exemplary embodiment of a gain controller shown in FIG. 4.

FIG. 8 is a diagram illustrating an exemplary embodiment of the gain controller shown in FIG. 4.

Referring to FIG. 8, the gain controller 212 according to the exemplary embodiment of the invention changes the voltage value of a voltage output from the second voltage limiter 204. To this end, the gain controller 212 includes an OP-AMP 2121, a third resistor R3, and a fourth resistor R4.

A first input terminal (+) of the OP-AMP 2121 is supplied with a voltage from the second voltage limiter 204. Also, a second input terminal (−) of the OP-AMP 2121 is coupled to a second node N2 between the third resistor R3 and the fourth resistor R4. Here, the first input terminal (+) may be set as a non-inverting input terminal and the second input terminal (−) may be set as an inverting input terminal.

The third resistor R3 and the fourth resistor R4 are coupled in series between an output terminal of the OP-AMP 2121 and a third driving power source VD3. In an exemplary embodiment, the third driving power source VD3 may be set to a ground voltage, for example.

The gain of the OP-AMP 2121 is set corresponding to resistance values of the third resistor R3 and the fourth resistor R4. In an exemplary embodiment, the gain of the OP-AMP 2121 may be set as shown in Equation 1.

$$VSS = \left(1 + \frac{R3}{R4}\right) \times V2 \qquad \text{Equation 1}$$

In Equation 1, V2 denotes a voltage output from the second voltage limiter 204. When the resistance values of the third resistor R3 and the fourth resistor R4 are controlled in Equation 1, the voltage value of the gate-off voltage may be controlled.

Figure 9:
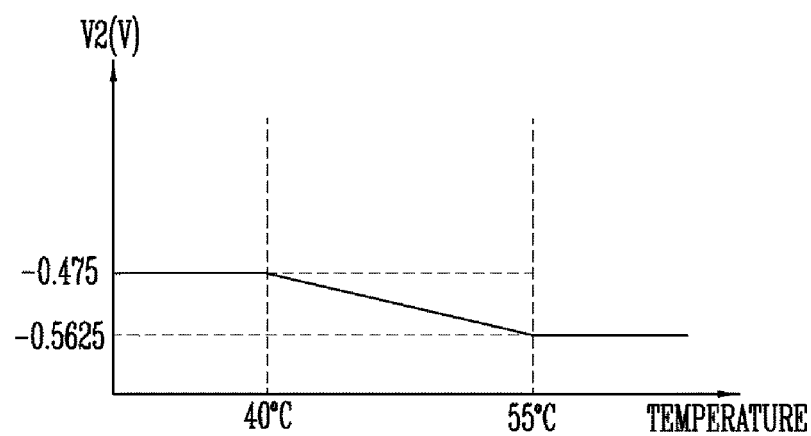
FIGS. 9 and 10 are diagrams illustrating embodiments of an operating process of the gain controller shown in FIG. 8.
Figure 9:
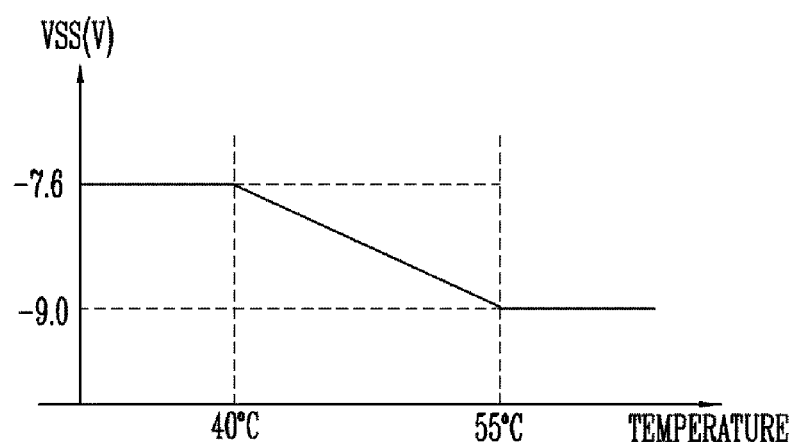

In an exemplary embodiment, as shown in FIG. 9, when the voltage V2 output from the second voltage limiter 204 is set to −0.475 V to −0.5625 V, the gain may be set to sixteen times, for example. Then, the gate-off voltage VSS may be set to −7.6 V to −9.0 V. That is, the gain controller 212 controls the resistance values of the third resistor R3 and the fourth resistor R4 (i.e., gain control), thereby generating the gate-off voltage VSS.

Figure 10:
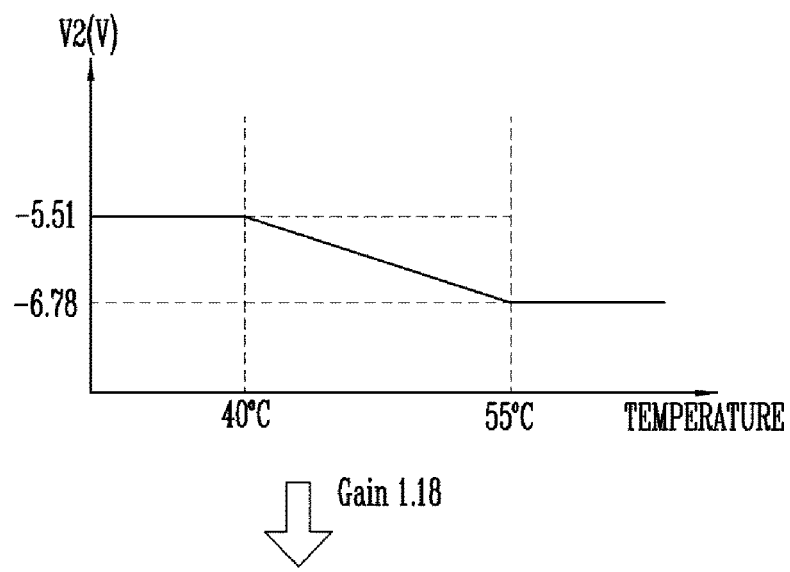
Figure 10:
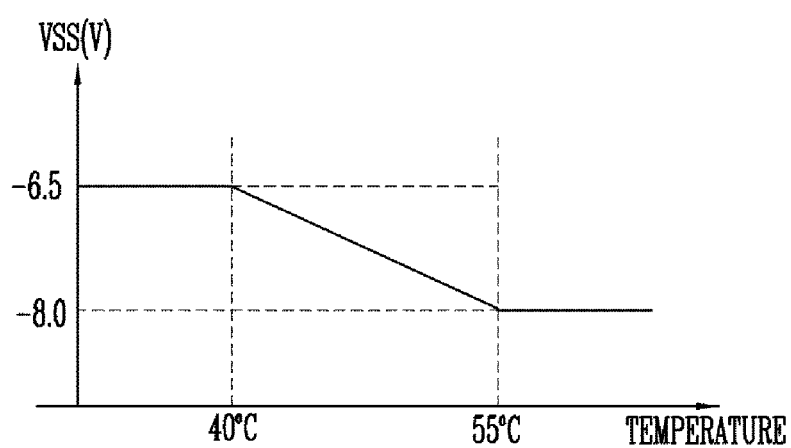

In an exemplary embodiment, when the voltage V2 output from the second voltage limiter 204 is set to −5.51 V to −6.78 V as shown in FIG. 10, the gain may be set to 1.18 times, for example. Then, the gate-off voltage VSS may be set to −6.5 V to −8.0 V. That is, the gain controller 212 controls the gain, thereby generating the gate-off voltage VSS required in the scan driver 110.

Figure 11:
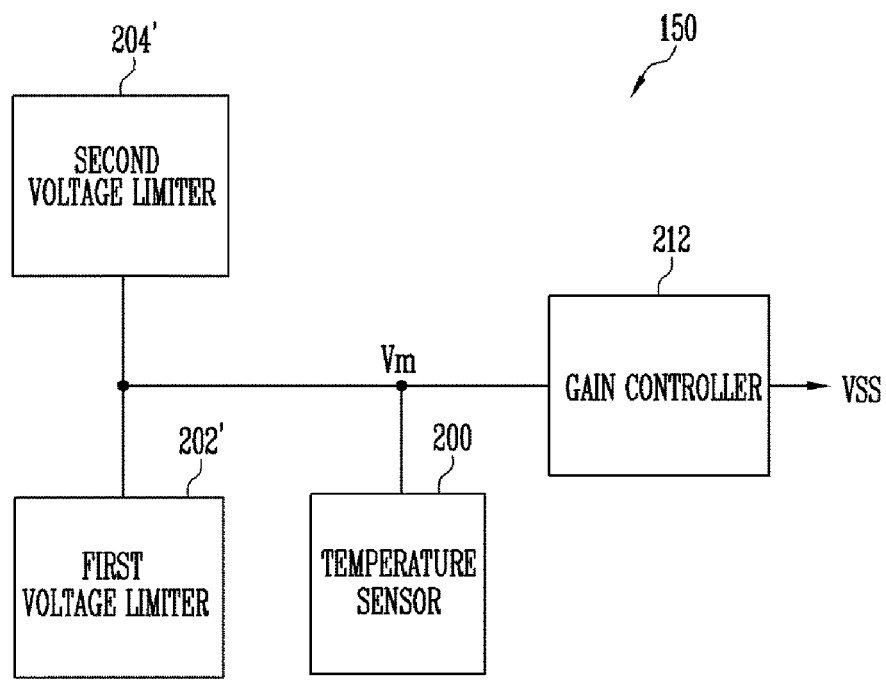
FIG. 11 is a diagram illustrating a power supply unit according to a third embodiment of the invention.

FIG. 11 is a diagram illustrating a power supply unit according to another exemplary embodiment of the invention. In FIG. 11, components identical to those of FIG. 3 are designated by like reference numerals, and their detailed descriptions will be omitted.

Referring to FIG. 11, the power supply unit 150 according to the exemplary embodiment of the invention includes a first voltage limiter 202', a second voltage limiter 204', a temperature sensor 200, and a gain controller 212.

The first voltage limiter 202' limits the minimum voltage value of a sensing voltage Vm. In an exemplary embodiment, the first voltage limiter 202' controls the sensing voltage Vm not to be decreased to less than a previously set minimum voltage value, for example.

The second voltage limiter 204' limits the maximum voltage value of the sensing voltage Vm. In an exemplary embodiment, the second voltage limiter 204' controls the sensing voltage Vm not to exceed a previously set maximum voltage value, for example.

Then, the sensing voltage Vm output from the temperature sensor 200 is set to a voltage between the minimum voltage value and the maximum voltage value. Here, as shown in FIG. 5, the minimum voltage value may be set to −9.0 V and the maximum voltage value may set to −7.6 V, for example. In this case, the sensing voltage maintains −7.6V when the temperature of the liquid crystal panel is lower than the second temperature, and maintains −9.0V when the temperature of the liquid crystal panel is higher than the first temperature.

Figure 12:
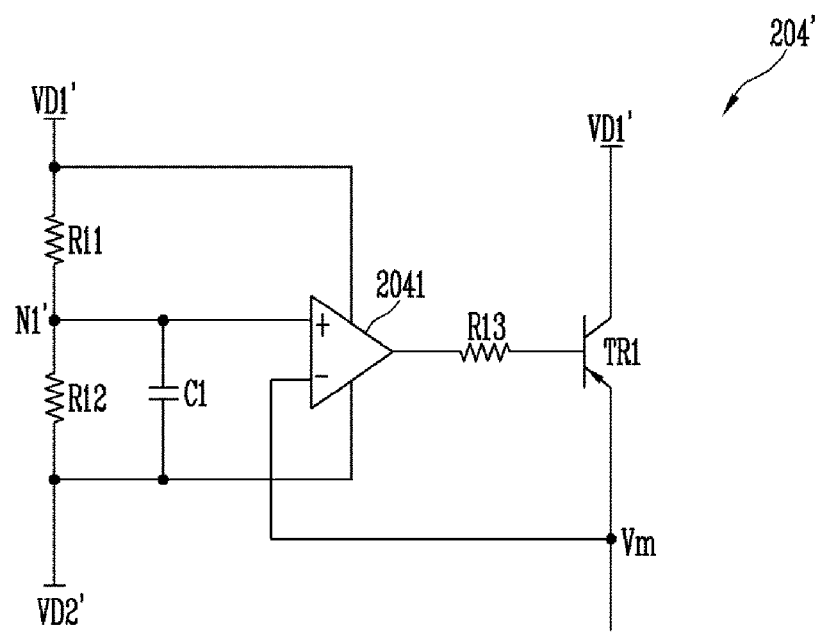
FIG. 12 is a diagram illustrating an exemplary embodiment of a second voltage limiter shown in FIG. 11.

FIG. 12 is a diagram illustrating an exemplary embodiment of the second voltage limiter shown in FIG. 11.

Referring to FIGS. 11 and 12, the second voltage limiter 204' according to the exemplary embodiment of the invention includes a first resistor R11, a second resistor R12, a third resistor R13, a first capacitor C1, an OP-AMP 2041, and a first transistor TR1.

The first resistor R11 and the second resistor R12 are coupled in series between a first driving power source VD1' and a second driving power source VD2'. In an exemplary embodiment, the first driving power source VD1' may be set to a negative voltage, and the second driving power source VD2' may be set to a ground voltage, for example. The first resistor R11 and the second resistor R12 divides a voltage between the first driving power source VD1' and the second driving power source VD2' and applies the divided voltage to a first node N1'.

The first capacitor C1 is coupled between the first node N1' and the second driving power source VD2'. The first capacitor C1 stably maintains a voltage of the first node N1'.

A first input terminal (+) of the OP-AMP 2041 is coupled to the first node N1', and a second input terminal (−) of the OP-AMP 2041 is coupled to the temperature sensor 200. That is, the second input terminal (−) is supplied with a sensing voltage Vm.

The third resistor R13 is coupled to an output terminal of the OP-AMP 2041 and a base terminal of the first transistor TR1.

An emitter terminal of the first transistor TR1 is supplied with the sensing voltage Vm from the temperature sensor 200, and a collector terminal of the transistor TR1 is coupled to the first driving power source VD1'. Also, a base terminal of the first transistor TR1 is coupled to the third resistor R13. In an exemplary embodiment, the first transistor TR1 is implemented as a PNP transistor, for example. Thus, the first transistor TR1 is turned on when the voltage of the first driving power source VD1' is supplied to the base terminal of the first transistor TR1, and turned off when the voltage of the second driving power source VD2' is supplied to the base terminal of the first transistor TR1.

Figure 13A:
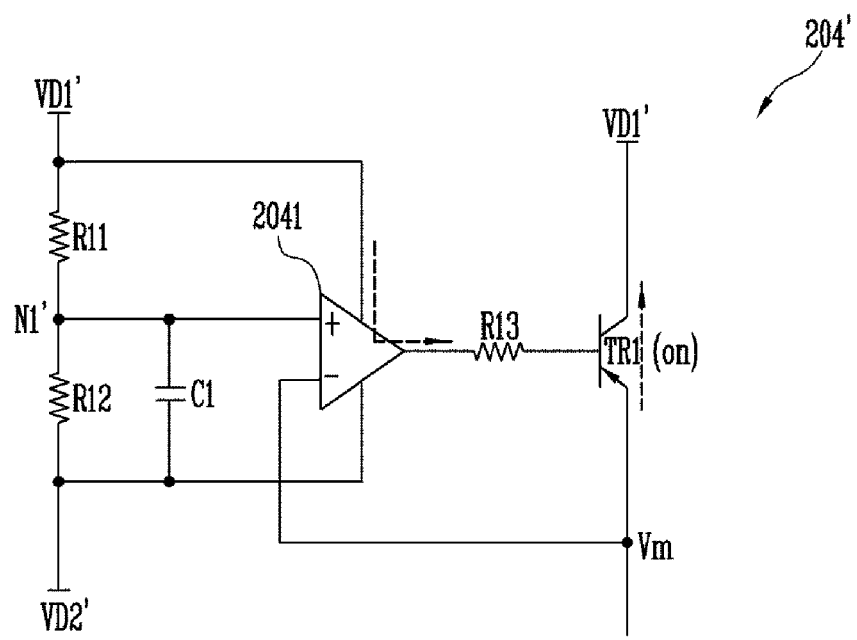
FIGS. 13A and 13B are diagrams illustrating an exemplary embodiment of an operating process of the second voltage limiter shown in FIG. 12.
Figure 13B:
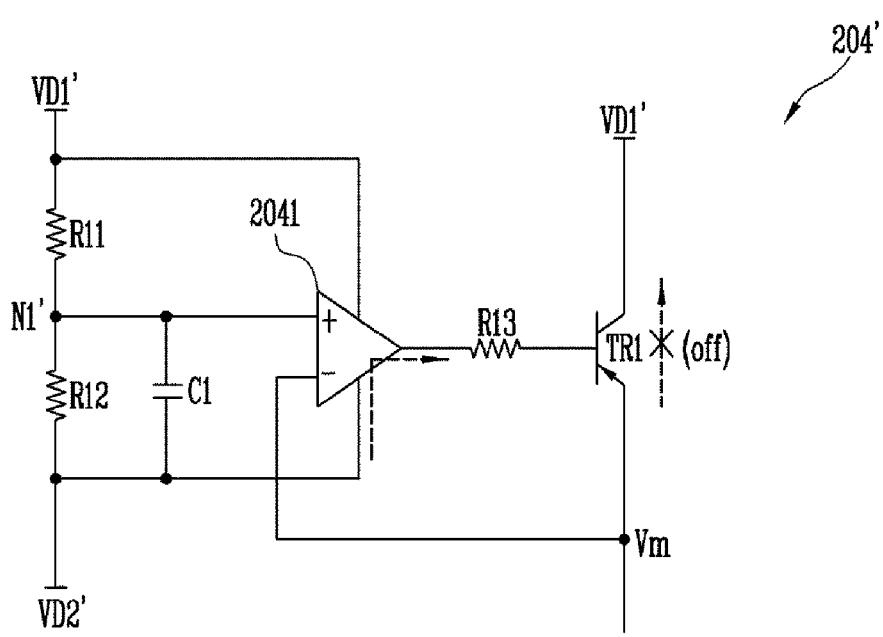

FIGS. 13A and 13B are diagrams illustrating an exemplary embodiment of an operating process of the second voltage limiter shown in FIG. 12.

Referring to FIGS. 13A and 13B, first, when the voltage (i.e., the sensing voltage Vm) of the second input terminal (−) is higher than the voltage of the first input terminal (+), the voltage of the first driving power source VD1' is supplied to the third resistor R13. When the voltage of the first driving power source VD1' is supplied to the third resistor R13, the first transistor TR1 is turned on. When the first transistor TR1 is turned on, current from the sensing voltage Vm is supplied to the first driving power source VD1', and accordingly, the voltage value of the sensing voltage Vm falls.

When the voltage of the second input terminal (−) is lower than the voltage of the first input terminal (+), the voltage of the second driving power source VD2' is supplied to the third resistor R13. When the voltage of the second driving power source VD2' is supplied to the third resistor R13, the first transistor TR1 is turned off. Then, the sensing voltage Vm maintains a current voltage.

Figure 14:
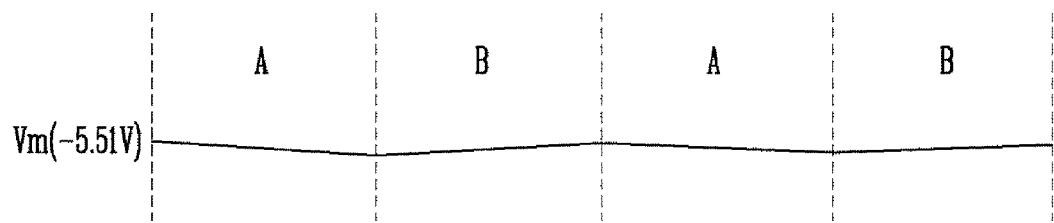
FIG. 14 is a diagram illustrating an exemplary embodiment of a voltage output from the second voltage limiter shown in FIG. 12.

That is, in the exemplary embodiment of the invention, the second voltage limiter 204' controls the sensing voltage Vm not to exceed the previously set voltage (i.e., the voltage of the first node N1'). In an exemplary embodiment, the voltage of the first node N1' may be set to −5.51 V, for example. In this case, the second voltage limiter 204' controls the sensing voltage Vm not to exceed about −5.51 V while repeating steps "A" and "B" shown in FIG. 14. Here, steps "A" and "B" illustrate that rising and falling are repeated so as to control the sensing voltage Vm not to exceed −5.51 V. However, the sensing voltage Vm may be set to about −5.51 V, corresponding to the response speed of an actual circuit.

Figure 15:
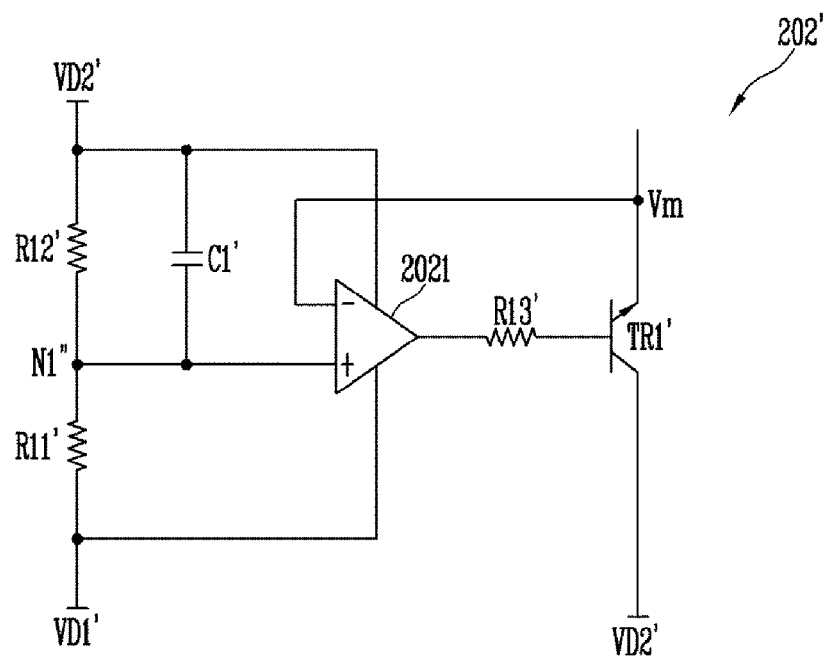
FIG. 15 is a diagram illustrating an exemplary embodiment of a first voltage limiter shown in FIG. 11.

FIG. 15 is a diagram illustrating an exemplary embodiment of the first voltage limiter shown in FIG. 11.

Referring to FIGS. 11 and 15, the first voltage limiter 202' according to the exemplary embodiment of the invention includes a first resistor R11', a second resistor R12', a third resistor R13', a first capacitor C1', an OP-AMP 2021, and a first transistor TR1'.

The first resistor R11' and the second resistor R12' are coupled in series between a first driving power source VD1' and a second driving power source VD2'. The first resistor R11' and the second resistor R12' divide a voltage between the first driving power source VD1' and the second driving power source VD2' and applies the divided voltage to a first node N1".

The first capacitor C1' is coupled between the first node N1" and the second driving power source VD2'. The first capacitor C1' stably maintains the voltage of the first node N1".

A first input terminal (+) of the OP-AMP 2021 is coupled to the first node N1", and a second input terminal (−) of the OP-AMP 2021 is coupled to the temperature sensor 200. That is, the second input terminal (−) is supplied with a sensing voltage Vm.

The third resistor R13' is coupled between an output terminal of the OP-AMP 2021 and a base terminal of the first transistor TR1'.

A collector terminal of the first transistor TR1' is coupled to the second driving power source VD2', and an emitter terminal of the first transistor TR1' is supplied with the sensing voltage Vm from the temperature sensor 200. Also, a base terminal of the first transistor TR1' is coupled to the third resistor R13'. In an exemplary embodiment, the first transistor TR1' is implemented as an NPN transistor, for example. Thus, the first transistor TR1' is turned off when the voltage of the first driving power source VD1' is supplied to the base terminal of the first transistor TR1', and turned on when the voltage of the second driving power source VD2' is supplied to the base terminal of the first transistor TR1'.

Figure 16A:
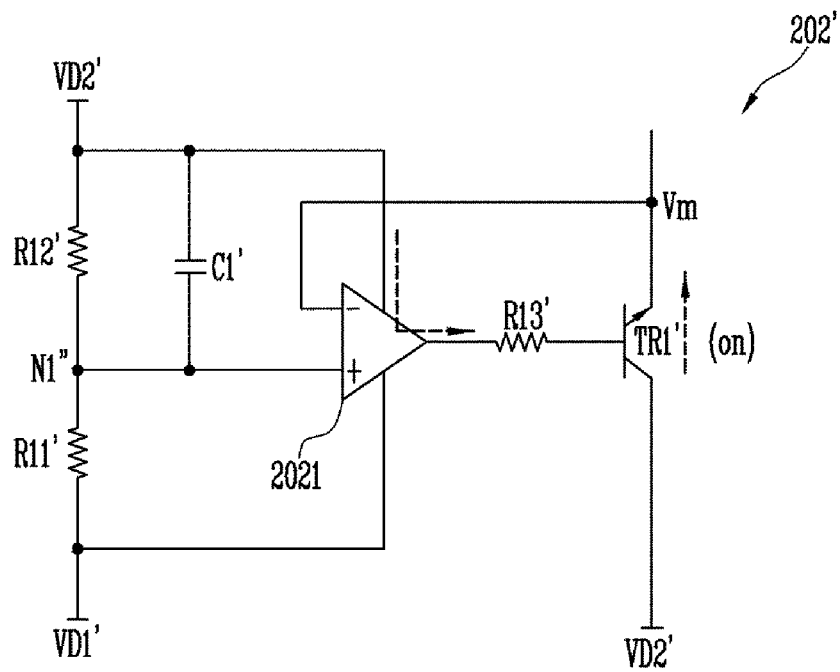
FIGS. 16A and 16B are diagrams illustrating an exemplary embodiment of an operating process of the first voltage limiter shown in FIG. 15.
Figure 16B:
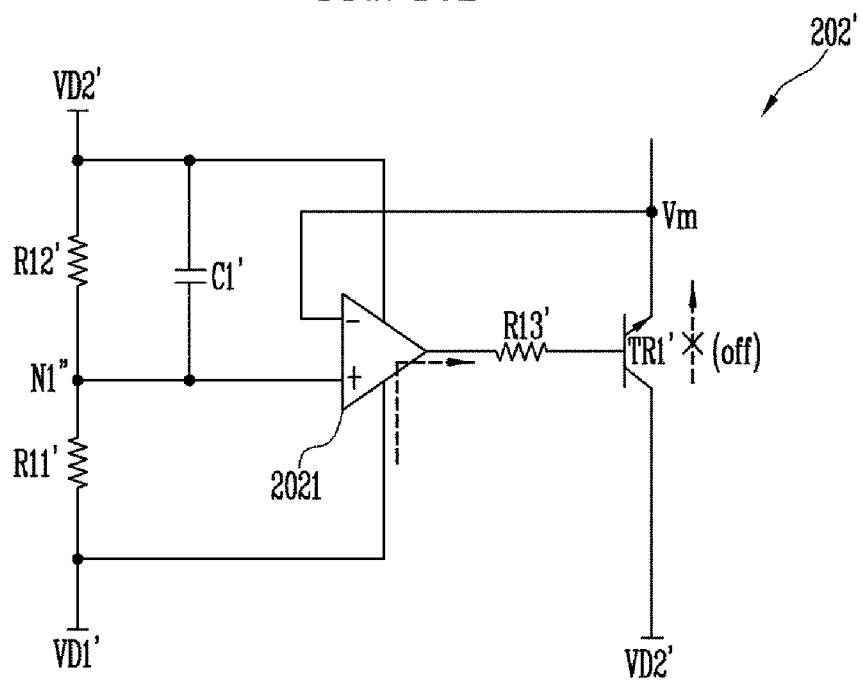

FIGS. 16A and 16B are diagrams illustrating an exemplary embodiment of an operating process of the first voltage limiter shown in FIG. 15.

Referring to FIGS. 16A and 16B, first, when the voltage of the second input terminal (−) (i.e., the sensing voltage Vm) is lower than the voltage of the first input terminal (+), the voltage of the second driving power source VD2' is supplied to the third resistor R13'. When the voltage of the second driving power source VD2' is supplied to the third resistor R13', the first transistor TR1' is turned on. When the first transistor TR1' is turned on, current from the second driving power source VD2' is supplied to the sensing voltage Vm, and accordingly, the voltage value of the sensing voltage Vm rises.

When the voltage of the second input terminal (−) is higher than the voltage of the first input terminal (+), the voltage of the first driving power source VD1' is supplied to the third resistor R13'. When the voltage of the first driving power source VD1' is supplied to the third resistor R13', the first transistor TR1' is turned off. Then, the sensing voltage Vm maintains a current voltage.

Figure 17:
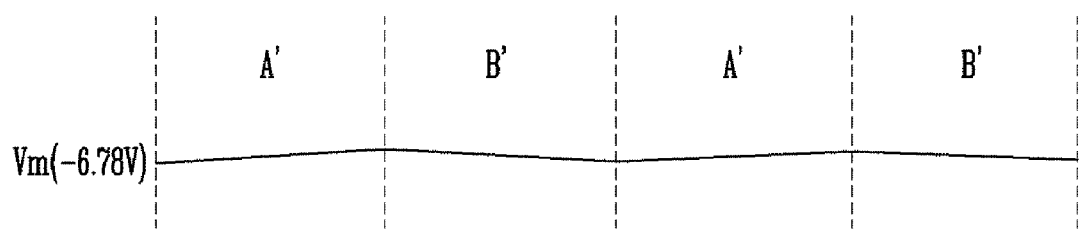
FIG. 17 is a diagram illustrating an exemplary embodiment of a voltage output from the first voltage limiter shown in FIG. 15.

That is, in the exemplary embodiment of the invention, the first voltage limiter 202' controls the sensing voltage Vm not to be decreased to less than the previously set voltage (i.e., the voltage of the first node N1"). In an exemplary embodiment, the voltage of the first node N1" may be set to −6.78 V, for example. In this case, the first voltage limiter 202' controls the sensing voltage Vm not to be decreased to less than about −6.78 V while repeating steps "A" and "B" shown in FIG. 17, for example.

Here, steps "A'" and "B'" illustrate that rising and falling are repeated so as to control the sensing voltage Vm not to be decreased to less than −6.78 V. However, the sensing voltage Vm may be set to about −6.78 V, corresponding to the response speed of an actual circuit.

The sensing voltage Vm from the temperature sensor 200 are set to about −5.51 V to −6.78 V, corresponding to the driving of the first voltage limiter 202' and the second voltage limiter 204', for example. After that, the gain controller 212 controls the gain as shown in FIG. 10, to generate a gate-off voltage VSS controlled corresponding to the temperature and supply the generated gate-off voltage VSS to the scan driver 110.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the invention as set forth in the following claims.

What is claimed is:
1. A display device comprising:
   a scan driver which supplies a gate-on voltage and a gate-off voltage to scan lines; and
   a power supply unit which supplies the gate-off voltage to the scan driver, and includes:

a temperature sensor which generates a sensing voltage of which a voltage value is changed corresponding to at least one of a temperature of a panel and an ambient temperature;

a first voltage limiter which limits a minimum voltage value of the sensing voltage; and a second voltage limiter which limits a maximum voltage value of the sensing voltage, wherein the first voltage limiter includes:

a first resistor and a second resistor, coupled in series between a first driving power source and a second driving power source having a higher voltage value than that of the first driving power source;

a first capacitor coupled between the second driving power source and a first node as a common node between the first resistor and the second resistor;

a first operational amplifier including a first input terminal, as a non-inverting input terminal, coupled to the first node and a second input terminal, as an inverting input terminal, supplied with the sensing voltage;

a third resistor coupled to a first output terminal of the first operational amplifier; and a first transistor including a base terminal coupled to the third resistor, a collector terminal coupled to the second driving power source, and an emitter terminal supplied with the sensing voltage.

2. The display device of claim 1, further comprising:

a first storage unit which stores a first control value corresponding to the minimum voltage value; and a second storage unit which stores a second control value corresponding to the maximum voltage value.

3. The display device of claim 2, wherein the first control value is set corresponding to a first temperature, and the second control value is set corresponding to a second temperature lower than the first temperature.

4. The display device of claim 2, wherein the first voltage limiter outputs the first control value when the sensing voltage is set to be less than the first control value, and otherwise, outputs the sensing voltage.

5. The display device of claim 2, wherein the second voltage limiter outputs the second control value when the sensing voltage exceeds the second control value, and otherwise, outputs the sensing voltage.

6. The display device of claim 2, further comprising a timing controller which controls the scan driver, wherein the first control value and the second control value are changeable by the timing controller.

7. The display device of claim 1, wherein the temperature sensor includes:

a fourth resistor and a fifth resistor coupled in series between a third driving power source and a fourth driving power source different from the third driving power source; and a thermistor coupled in parallel to the fourth resistor between the third driving power source and a second node which is a common node of the fourth resistor and the fifth resistor, wherein a voltage of the second node is the sensing voltage.

8. The display device of claim 7, wherein the thermistor is a negative temperature coefficient thermistor.

9. The display device of claim 1, further comprising a voltage converter which changes the voltage value of the sensing voltage and supplies the changed voltage value to the first voltage limiter.

10. The display device of claim 1, further comprising a gain controller which generates the gate-off voltage by changing a voltage value of a voltage output from the second voltage limiter, corresponding to a gain.

11. The display device of claim 10, wherein the gain controller includes:

a second operational amplifier including a third input terminal as a non-inverting input terminal, a fourth input terminal as an inverting input terminal, and a second output terminal; and a fourth resistor and a fifth resistor coupled in series between the second output terminal and a third driving power source, wherein the third input terminal is coupled to the second voltage limiter, and the fourth input terminal is coupled to a second node as a common node of the fourth resistor and the fifth resistor.

12. The display device of claim 1, wherein the first operational amplifier supplies a voltage of the second driving power source to the third resistor when a voltage of the second input terminal is lower than a voltage of the first input terminal, and supplies a voltage of the first driving power source to the third resistor when the voltage of the second input terminal is higher than the voltage of the first input terminal.

13. The display device of claim 12, wherein the first transistor is turned on when the voltage of the second driving power source is supplied thereto, and turned off when the voltage of the first driving power source is supplied thereto.

14. The display device of claim 1, wherein the second voltage limiter includes:

a fourth resistor and a fifth resistor, coupled in series between a third driving power source and a fourth driving power source having a higher voltage value than that of the third driving power source;

a second capacitor coupled between the fourth driving power source and a second node as a common node between the fourth resistor and the fifth resistor;

a second operational amplifier including a third input terminal, as a non-inverting input terminal, coupled to the second node and a fourth input terminal, as an inverting input terminal, supplied with the sensing voltage;

a sixth resistor coupled to an output terminal of the second operational amplifier; and a second transistor including a base terminal coupled to the sixth resistor, a collector terminal coupled to the third driving power source, and an emitter terminal supplied with the sensing voltage.

15. The display device of claim 14, wherein the second operational amplifier supplies a voltage of the third driving power source to the sixth resistor when a voltage of the fourth input terminal is higher than a voltage of the third input terminal, and supplies a voltage of the fourth driving power source to the sixth resistor when the voltage of the fourth input terminal is lower than the voltage of the third input terminal.

16. The display device of claim 15, wherein the second transistor is turned on when the voltage of the third driving power source is supplied, and turned off when the voltage of the fourth driving power source is supplied.

\* \* \* \* \*